US010586532B1

(12) United States Patent
Cavallo et al.

(10) Patent No.: US 10,586,532 B1
(45) Date of Patent: Mar. 10, 2020

(54) FLEXIBLE-RESPONSE DIALOGUE SYSTEM THROUGH ANALYSIS OF SEMANTIC TEXTUAL SIMILARITY

(71) Applicant: Babylon Partners Limited, London (GB)

(72) Inventors: Pietro Cavallo, London (GB); Olufemi Awomosu, London (GB); Francesco Moramarco, London (GB); April Tuesday Shen, London (GB); Nils Hammerla, London (GB)

(73) Assignee: Babylon Partners Limited, London (GB)

( * ) Notice: Subject to any disclaimer, the term of this patent is extended or adjusted under 35 U.S.C. 154(b) by 0 days.

(21) Appl. No.: 16/259,872

(22) Filed: Jan. 28, 2019

(51) Int. Cl.
*G06F 17/27* (2006.01)
*G10L 15/18* (2013.01)
*G10L 15/22* (2006.01)

(52) U.S. Cl.
CPC ...... *G10L 15/1815* (2013.01); *G06F 17/2785* (2013.01); *G10L 15/22* (2013.01); *G10L 2015/221* (2013.01); *G10L 2015/225* (2013.01)

(58) Field of Classification Search
CPC . G06F 17/2785; G06F 16/243; G06F 16/3344
See application file for complete search history.

(56) References Cited

U.S. PATENT DOCUMENTS

| 7,246,062 B2* | 7/2007 | Knott | G10L 15/22 704/246 |
| 9,275,637 B1* | 3/2016 | Salvador | G10L 15/01 |
| 2002/0103837 A1* | 8/2002 | Balchandran | G06F 17/274 715/264 |
| 2004/0220920 A1* | 11/2004 | Bax | G06F 7/02 |
| 2004/0243568 A1* | 12/2004 | Wang | G06F 16/313 |
| 2012/0131033 A1* | 5/2012 | Bierner | G06F 16/3322 707/767 |

(Continued)

OTHER PUBLICATIONS

List, Johann-Mattis, Simon J. Greenhill, and Russell D. Gray. "The potential of automatic word comparison for historical linguistics." PloS one 12.1 (2017): (Year: 2017).*

(Continued)

*Primary Examiner* — Jialong He
(74) *Attorney, Agent, or Firm* — McDermott Will & Emery LLP

(57) ABSTRACT

The disclosed system addresses a technical problem tied to computer technology and arising in the realm of computer memory capacity, namely the technical problem of providing a flexible response dialogue system that can be utilised for a variety of different types of dialogue without requiring the system to be specifically trained for each situation. This therefore avoids the need for large amounts of labelled training data for each type of dialogue (each potential conversation flow or subject area for the conversation). The disclosed system solves this technical problem by using semantic similarity to match a user's input to one of a set of predefined inputs (predefined user responses). Various mechanisms are implemented to provide disambiguation in the event of multiple potential matches for the input. By using semantic similarity, the user's response in unconstrained. This therefore provides a user interface that is more user-friendly.

13 Claims, 5 Drawing Sheets

(56) References Cited

U.S. PATENT DOCUMENTS

| | | | | |
|---|---|---|---|---|
| 2013/0262501 | A1* | 10/2013 | Kuchmann-Beauger | G06F 16/24535 707/769 |
| 2014/0025706 | A1* | 1/2014 | Barve | G06F 17/21 707/771 |
| 2014/0032574 | A1* | 1/2014 | Khan | G06F 16/245 707/754 |
| 2014/0074454 | A1* | 3/2014 | Brown | G10L 15/08 704/9 |
| 2014/0079195 | A1* | 3/2014 | Srivastava | G06F 17/21 379/88.01 |
| 2014/0163962 | A1* | 6/2014 | Castelli | G06F 17/2715 704/9 |
| 2014/0316768 | A1* | 10/2014 | Khandekar | G06F 16/3329 704/9 |
| 2016/0140958 | A1* | 5/2016 | Heo | G06F 17/2785 704/9 |
| 2017/0228520 | A1* | 8/2017 | Kidd | G06F 19/3481 |

OTHER PUBLICATIONS

Bastianelli, Emanuele, et al. "Effective and Robust Natural Language Understanding for Human-Robot Interaction." ECAI. 2014. (Year: 2014).*

Burgess, "The NHS is trialling an AI chatbot to answer your medical questions", 2017. (Year: 2017).*

Artzi, Y. and L Zettlemoyer, 2011. Bootstrapping Semantic Parsers from Conversations. In EMNLP.

Baker, C. F., C. J. Fillmore, and J. B. Lowe 1998. The Berkeley FrameNet Project. In COLING.

Bobrow, D. G., R. M. Kaplan, M. Kay, D. A. Norman, H. Thompson, and T. Winograd 1977. GUS, a frame-driven dialog system. Artificial Intelligence, 8(2):155-173.

Bocklisch, T., J. Faulkner, N. Pawlowski, and A. Nichol 2017. Rasa: Open Source Language Understanding and Dialogue Management. NIPS Conversational AI Workshop.

Bordes, A., Y.-L Boureau, and J. Weston 2017. Learning End-To-End Goal-Oriented Dialog. ICLR.

Cer, D., Y. Yang, S.-Y. Kong, N. Hua, N. Limtiaco, R. S. John, N. Constant, M. Guajardo-Cespedes, S. Yuan, C. Tar, Y.-H. Sung, B. Strope, and R. Kurzweil 2018. Universal Sentence Encoder.

Dong, L. and M. Lapata, 2016. Language to Logical Form with Neural Attention. In ACL, pp. 33-43.

Gildea, D. and D. Jurafsky, 2002. Automatic Labeling of Semantic Roles. Computational Linguistics.

Goddeau, D., H. Meng, J. Polifroni, S. Seneff, and S. Busayapongchaiy 1996. A Form-Based Dialogue Manager for Spoken Language Applications. In Proceeding of Fourth International Conference on Spoken Language Processing.

Goldwater, S., D. Jurafsky, and C. D. Manning 2010. Which words are hard to recognize? Prosodic, lexical, and disfluency factors that increase speech recognition error rates. Speech Communication.

Jurafsky, D. and J. H. Martin 2017. Speech and Language Processing: An Introduction to Natural Language Processing, Computational Linguistics, and Speech Recognition (Third Edition draft).

Kate, R. J. and R. J. Mooney 2006. Using String-Kernels for Learning Semantic Parsers. In COLING/ACL, pp. 913-920.

Kiros, R., Y. Zhu, R. Salakhutdinov, R. S. Zemel, A. Torralba, R. Urtasun, and S. Fidler 2015. Skip-Thought Vectors. NIPS.

Kumar, A., A. Gupta, J. Chan, S. Tucker, B. Hoffmeister, M. Dreyer, S. Peshterliev, A. Gandhe, D. Filiminov, A. Rastrow, C. Monson, and A. Kumar, 2017. Just ASK: Building an Architecture for Extensible Self-Service Spoken Language Under standing. NIPS Conversational AI Workshop.

Liang, P., M. I. Jordan, and D. Klein 2013. Learning Dependency-Based Compositional Semantics. Computational Linguistics.

Liu, B., G. Tür, D. Hakkani-Tor, P. Shah, and L. Heck 2017. End-to-End Optimization of Task-Oriented Dialogue Model with Deep Reinforcement Learning. NIPS Conversational AI Workshop.

Martin-Fuertes, L. B. 2018. Google I/O: Multiple Actions or Double Intent.

Mortensen, D. R., P. Littell, A. Bharadwaj, K. Goyal, C. Dyer, and L. Levin, 2016. PanPhon: A Resource for Mapping IPA Segments to Articulatory Feature Vectors. Coling, pp. 3475-3484.

Ram, A., R. Prasad, C. Khatri, A. Venkatesh, R. Gabriel, Q. Liu, J. Nunn, B. Hedayatnia, M. Cheng, A. Nagar, E. King, K. Bland, A.Wartick, Y. Pan, H. Song, S. Jayadevan, G. Hwang, and A. Pettigrue 2017. Conversational AI: The Science Behind the Alexa Prize.

Serban, I. V., C. Sankar, M. Germain, S. Zhang, Z. Lin, S. Subramanian, T. Kim, M. Pieper, S. Chandar, N. R. Ke, S. Rajeswar, A. De Brebisson, J. M. R. Sotelo, D. Suhubdy, V. Michalski, A. Nguyen, J. Pineau, and Y. Bengio 2017. A Deep Reinforcement Learning Chatbot. NIPS Conversational AI Workshop.

Stolcke, A. and J. Droppo 2017. Comparing Human and Machine Errors in Conversational Speech Transcription.

Turing, A. M., 1950. Computing Machinery and Intelligence. Technical report.

Williams, J. D., K. Asadi, and G. Zweig 2017. Hybrid Code Networks: practical and efficient end-to-end dialog control with supervised and reinforcement learning. In 55th Annual Meeting of the Association for Computational Linguistics.

Woods, W. A, 1973. Progress in natural language understanding—An application to lunar geology. In National Computer Conference and Exposition.

Xu, P. and R. Sarikaya 2013. Exploiting Shared Information for Multi-intent Natural Language Sentence Classification. Interspeech.

Young, S., G. Gašic, B. Thomson, and J. D. Williams 2013. POMDP-based Statistical Spoken Dialogue Systems: a Review. Technical Report 5.

Zhelezniak, V., D. Busbridge, A. Shen, S. L. Smith, and N. Y. Hammerla 2018. Decoding Decoders: Finding Optimal Representation Spaces for Unsupervised Similarity Tasks. ICLR.

Thong, V., C. Xiong, and R. Socher SEQ2SQL: Generating Structured Queries Fromnatural Language Using Reinforcement Learning. Technical report, Published 2017.

* cited by examiner

FLEXIBLE-RESPONSE DIALOGUE SYSTEM THROUGH ANALYSIS OF SEMANTIC TEXTUAL SIMILARITY

TECHNICAL FIELD

The present disclosure relates to natural language processing for use in dialogue systems. In particular, but without limitation, this disclosure relates to methods and devices for determining dialogue responses to natural language user inputs.

BACKGROUND

Natural language processing and dialogue systems, such as chatbots, are now becoming commonplace in many fields. Natural language processing relates to the methods by which computers process and analyse natural language data. Dialogue systems (or conversational agents) are computer systems intended to converse with humans in a coherent manner.

Newer approaches to dialogue systems powered by machine learning have garnered much interest and increasing success. Having said this, there are still a multitude of obstacles to their adoption including the difficulty in training and validating machine learning models. This is especially relevant in domains such as health care, where quality annotated datasets are limited and careful validation is crucial for safety and regulatory reasons.

Given these constraints, manual dialogue creation and management is still common in industry. Such dialogues are usually crafted by domain experts, who typically think of conversations as a form of tree with distinct choices corresponding to the various paths. A conversational agent operating under these conditions is referred to herein as a constrained-response chatbot as the valid user responses (e.g. answers) to dialogue prompts (e.g. questions) from the system are constrained. These are generally manifested in text with multiple choice questions or similar visual elements.

The downsides of constrained-response chatbots include a lack of flexibility, naturalness, and usability of the conversation flows. This is especially problematic in the case of voice support, where the inability to constrain user inputs often necessitates a rigid "phone tree"—like dialogue system ("Press 1 for . . . "), or training a separate classification model specific to each branching step in order to send users down the correct path. Supporting voice modality forces a constrained-response chatbot to become a free-response chatbot, one that accepts any arbitrary utterance. Having said this, converting to free-response chatbots in a manner that is flexible and robust yet still accurate and safe is a great challenge.

SUMMARY

In light of the above, it can be seen that there is therefore a need for an improved dialogue system that provides flexibility and usability whilst also maintaining the validity and control of conversation flows.

Embodiments described herein provide methods for converting a constrained-response chatbot to a free-response chatbot, potentially one based on voice. This allows the dialogue system to leverage existing textual similarity algorithms and information extraction pipelines, while maintaining the validity and control of existing manually configured conversation flows. Most of these techniques can be used in the context of any free-text chatbot, though several are more specific to voice support.

The methods described herein are more flexible than previous free-response methods, as they avoid the need to train a classifier for each question that is asked. This provides improved performance of an associated computer, in that it avoids the need to obtain the large amounts of training data (and associated memory storage capacity) required to train such systems, and provides improved flexibility in defining the various inputs and outputs (e.g. questions and answers) within the conversation flow.

According to a first aspect, there is provided a computer-implemented natural language processing method comprising: (a) receiving a user input comprising a set of one or more words; (b) retrieving a predefined set of potential inputs, each potential input comprising one or more words; (c) determining, for each of the potential inputs, a similarity score indicating similarity between the respective potential input and the user input; (d) determining whether any of the potential inputs has a similarity score that exceeds a predefined threshold; and (e) in response to exactly one of the potential inputs having a similarity score that exceeds the predefined threshold, selecting the one of the potential inputs and outputting a response based on the one of the potential inputs.

By matching the user input to one of the predefined inputs using a similarity metric, the method can receive a flexible natural language input from the user without needing to train a specific classifier for recognising the input. The user input could be an utterance (a digital representation of a sound of an utterance) wherein the words in the utterance are identified using automatic speech recognition techniques. Alternatively, the input could be input text (e.g. via a keyboard) that includes computer representations of the words within the text (e.g. via word vectors).

In the present embodiment, the method outputs a response to the one of the potential inputs (the potential input that matches the user input). This response can be a prompt for further information from the user, or could be an act to be performed by the computing system (e.g. in response to an instruction from the user). In one embodiment, the response is a response is a next stage within a dialogue between a conversational agent and the user. The response may be a next stage in a predefined dialogue flow, or may be generated using an inference engine (based on the one of the potential inputs), for instance, in order to obtain further information to reach a desired goal (e.g. to infer the answer to an overall question).

According to an embodiment, the similarity scores are determined based on a first measure of similarity and the method further comprises, in response to a plurality of potential inputs having a similarity score that exceeds the predefined threshold, determining, for each of the plurality of potential inputs, a further similarity score indicating similarity between the respective potential input and the user input, wherein the further similarity score is based on a second measure of similarity that differs from the first measure of similarity. This provides a means of disambiguation.

According to a further embodiment, the method comprises determining whether any of the plurality of potential inputs has a further similarity score that exceeds a further predefined threshold and, in response to exactly one of the plurality of potential inputs having a further similarity score that exceeds the further predefined threshold, selecting the one of the potential inputs and outputting a response based on the one of the plurality of potential inputs.

According to a further embodiment, the second measure of similarity is one or more of: higher precision than the first measure of similarity; lower recall than the first measure of similarity; more sensitive to exact word choices than the first measure of similarity; or more sensitive to negation within the user input or the potential inputs than the first measure of similarity.

According to a further embodiment, the user input is derived from speech recognition of a user utterance and the second measure is based on phonetic distance. This allows effective recognition of the input even where there have been inaccuracies in the transcription of the user utterance. The automatic speech recognition may form part of the method (performed by the same system) or may the input may be received from another system that has performed automatic speech recognition in order to transcribe the utterance.

According to a further embodiment, the second measure is based on the edit distance between phonetic representations of the respective inputs. In a further embodiment, the phonetic representations comprise Dolgopolsky equivalence classes. That is, the edit distance may be performed based on the phonetic representation (e.g. the Dolgopolsky equivalence classes) for the user input and the phonetic representation for the respective potential input.

In a further embodiment, the method comprises, in response to none of the plurality of potential inputs having a further similarity value that exceeds the predetermined threshold, issuing a request to the user to repeat their input.

According to a further embodiment, the request to the user to repeat their input comprises a notification to the user of each of the plurality of potential inputs.

In a further embodiment, the method further comprises, in response to none of the potential inputs having a similarity value that exceeds the predetermined threshold, issuing a request to the user to repeat their input. In accordance with an embodiment, the request to the user to repeat their input comprises a notification to the user of each of the potential inputs. As shall be discussed later, this request may be with regard to only one user input. Alternatively, where multiple user inputs are received (e.g., multiple inferred clauses extracted from an initial user input), then the request may be issued only when none of the user inputs has a similarity value with regard to any of the potential inputs that exceeds the predetermined threshold.

According to a further embodiment, the user input forms part of an initial user input and the user input is derived from the initial user input by: determining a semantic graph representing the semantic relationship between the words within the initial user input; determining multiple inferred clauses from the initial user input based on the semantic graph; selecting one of the inferred clauses as the user input.

According to a further embodiment, the method comprises repeating steps (a)-(e) for a further user input formed from a further one of the inferred clauses. In a further embodiment, the response is output based on each of the selected inputs for each of the inferred clauses.

According to a further embodiment, the method comprises, in response to none of the plurality of potential inputs having a similarity value that exceeds the predetermined threshold with respect to any of the inferred clauses, issuing a request to the user to repeat their input.

According to a further embodiment, the method comprises performing information extraction to extract structured information from one or more of the inferred clauses for use in determining the response.

According to an embodiment, one or more of the potential inputs comprises a plurality of possible phrases corresponding to the potential input and the corresponding similarity score for each of the one or more potential inputs is determined by: determining a similarity score for each possible phrase indicating the similarity between the respective possible phrase and the user input; and determining a maximum of the similarity scores for the possible phrases.

According to a further aspect, there is provided a system for natural language processing, the system comprising a processor configured to: receive a user input comprising a set of one or more words; retrieve a predefined set of potential inputs, each potential input comprising one or more words; determine, for each of the potential inputs, a similarity score indicating similarity between the respective potential input and the user input; determine whether any of the potential inputs has a similarity score that exceeds a predefined threshold; and in response to exactly one of the potential inputs having a similarity score that exceeds the predefined threshold, select the one of the potential inputs and outputting a response based on the one of the potential inputs.

According to a further aspect, there is provided a non-transitory computer readable medium comprising instructions that, when executed by a computer, cause the computer to perform any of the methods described herein.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

The present application presents an elegant and innovative method for supporting free user responses using modern distributed sentence representation and information extraction techniques, while still maintaining the safety and control of validated constrained choice conversations. This is particularly advantageous for applications wherein inaccurate recognition is costly, for instance, in medical applications.

The disclosed system provides an improvement to computer functionality by allowing for reduced memory capacity requirements for producing and implementing a free-response dialogue system. Specifically, the disclosed system addresses a technical problem tied to computer technology and arising in the realm of computer memory capacity, namely the technical problem of providing a flexible response dialogue system that can be utilised for a variety of different types of dialogue without requiring the system to be specifically trained for each situation. This therefore avoids the need for large amounts of labelled training data for each type of dialogue (each potential conversation flow or subject area for the conversation). The disclosed system solves this technical problem by using semantic similarity to match a user's input to one of a set of predefined inputs (predefined user responses). Various mechanisms are implemented to provide disambiguation in the event of multiple potential matches for the input. By using semantic similarity, the user's response in unconstrained. This therefore provides a user interface that is more user-friendly. Furthermore, by limiting the inputs to match one or more predefined inputs, the safety of a predefined dialogue flow is maintained for ensuring the accuracy and validation of the system.

Figure 1:
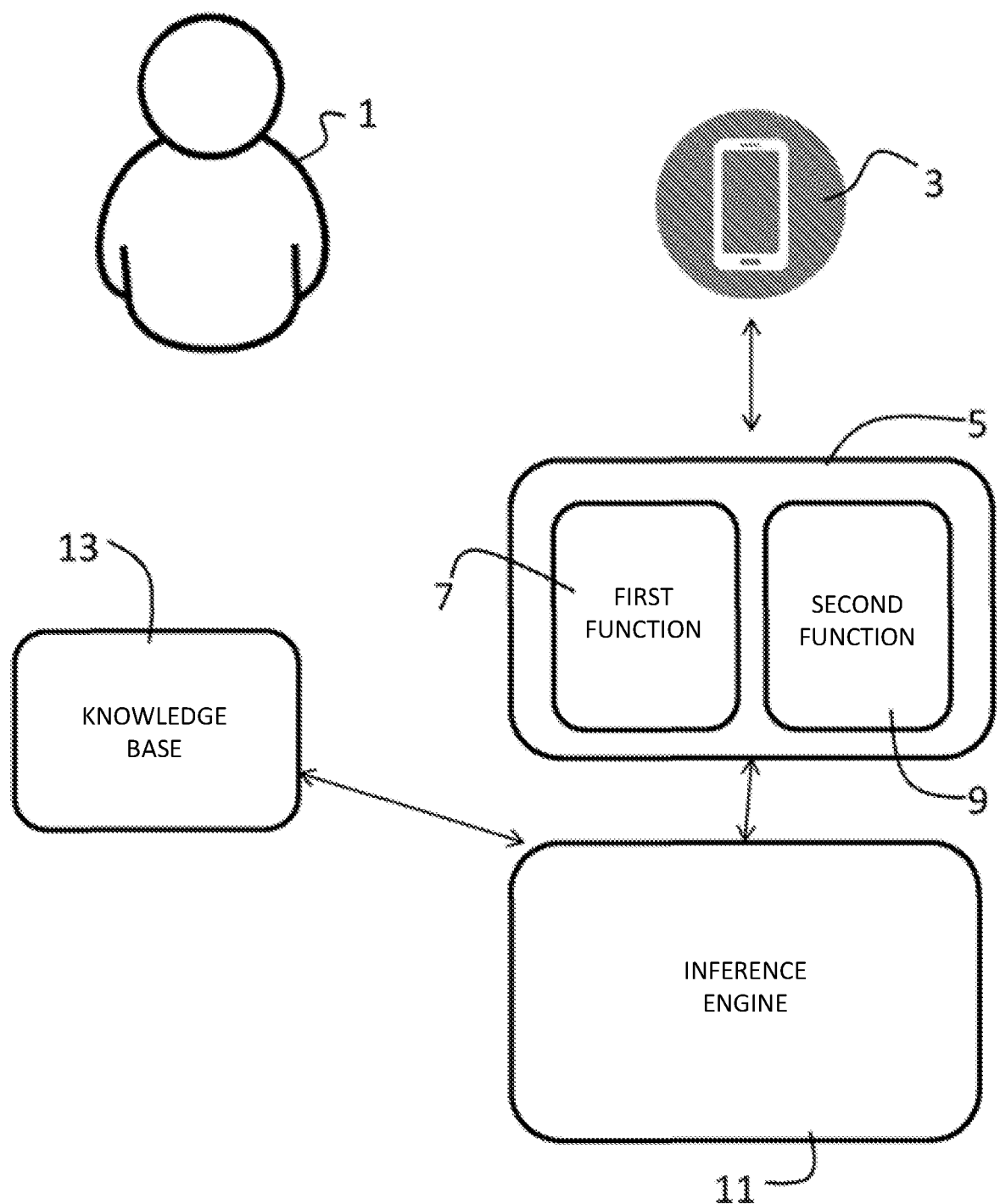
FIG. 1 shows a schematic of a diagnostic system according to an embodiment.

FIG. 1 shows a schematic of a diagnostic system according to an embodiment. In one embodiment, a user 1 communicates with the system via a mobile phone 3. However, any device could be used, which is capable of communicating information over a computer network, for example, a laptop, tablet computer, information point, fixed computer, voice assistant, etc.

The mobile phone 3 communicates with interface 5. Interface 5 has two primary functions; the first function 7 is to take the words input by the user and turn them into a form that can be understood by the inference engine 11. These words may be text that is input (e.g. typed) into the mobile phone. Alternatively, these words may be spoken (uttered) by the user and recorded by the phone, for instance, via a microphone. The second function 9 is to take the output of the inference engine 11 and to send this back to the user's mobile phone 3.

In the present embodiments, Natural Language Processing (NLP) is used in the interface 5. NLP is one of the tools used to interpret, understand, and then use every day human language and language patterns. It breaks speech or text down into shorter components and interprets these more manageable blocks to understand what each individual component means and how it contributes to the overall meaning. The system can then link the occurrence of medical terms within the text to the knowledge base. Through NLP it is possible to transcribe consultations, summarise clinical records and converse with users in a more natural, human way.

The interface 5 utilises a conversation-handling module for managing dialogue flows with a user. This is a dialogue system that generates queries for the user and matches inputs with expected answers. The conversation-handling model may be provided with simple logic which allows the device to, for example, direct the user 1 to a human operator, if required.

In order to more effectively determine the meaning behind the input text, the dialogue system embeds the input text to generate a vector representation for the input text. The vector representations are generated based on machine learning models that have been trained on training data. In this case, the models are also evaluated by a medical professional.

The dialogue system utilises the vector representations to determine the meaning of the input text. This is achieved by comparing the vector representation of the input text (which will be referred to hereinafter as the input vector representation) to other vector representations stored in a database. The other vector representations represent predefined inputs that the user may utilise (e.g. predefined answers to a question posed by the dialogue system). The dialogue system determines whether the input vector representation is similar to other vector representations within the database.

In an embodiment, if the input vector representation is determined to be similar to one of the vector representations, then this stored vector representation is selected as the user's input. The system then processes the input and outputs a response based on the selected input.

In a further embodiment, if no sufficiently similar predefined inputs are located within the database, or if multiple potential similar inputs are available, then the system implements various methods to determine the user's intended input. These methods are described in more detail below.

Naturally, it is important that user's inputs are recognised effectively. The present embodiments are primarily concerned with improving input recognition accuracy and computational efficiency. However, simply understanding how users express their symptoms and risk factors is not enough to identify and provide reasons about the underlying set of diseases. For this, the inference engine 11 is used. The inference engine 11 is a powerful set of machine learning systems, capable of reasoning on a space of >100s of billions of combinations of symptoms, diseases and risk factors, per second, to suggest possible underlying conditions. The inference engine 11 can provide reasoning efficiently, at scale, to bring healthcare to millions.

In an embodiment, the knowledge base 13 is a large structured set of data defining a medical knowledge base. The knowledge base 13 describes an ontology, which in this case relates to the medical field. It captures human knowledge on modern medicine encoded for machines. This is used to allow the above components to speak to each other. The knowledge base 13 keeps track of the meaning behind medical terminology across different medical systems and different languages. In particular, the knowledge base 13 includes data patterns describing a plurality of semantic triples, each including a medical related subject, a medical related object, and a relation linking the subject and the object. An example use of the knowledge base would be in automatic diagnostics, where the user 1, via mobile device 3, inputs symptoms they are currently experiencing, and the interface engine 11 identifies possible causes of the symptoms using the semantic triples from the knowledge base 13.

The present embodiment relates to an interface for handling medical queries based on content that is authored by a medical professional; however, it will be appreciated that this can equally be applied to any type of query for any type of content.

The aim of the system described herein it to make use of the security of constrained response chatbots whilst providing the flexibility and efficiency of free-response chatbots.

Figure 2:
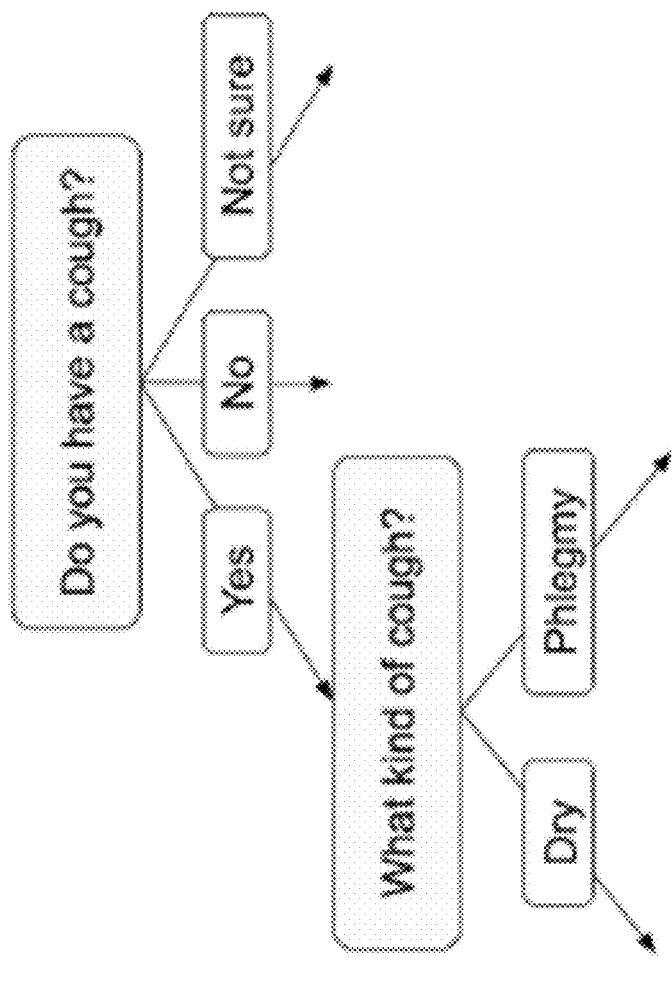
FIG. 2 shows a flowchart depicting a constrained response chatbot for implementing the methods described herein.

FIG. 2 shows a flowchart of depicting a constrained response chatbot. Constrained-answer conversation flows are depicted as a graph, with nodes as states corresponding to questions and outgoing edges as potential answers to the question. The user is limited to responding through use of only a select number of responses and the system is unable to interpret responses that do not fit within the predefined list of possible responses.

For instance, in the present example, the user is presented with the question "Do you have a cough?" The user may provide one of three predefined answers: "Yes", "No", or "Not sure". If the user answers "Yes", then a follow-up question is asked: "What kind of cough?" The user can then respond with by stating either "Dry" or "Phlegmy".

As this example is a constrained response chatbot, there is no flexibility in the potential user responses, or any ability to cope with alternative responses to those that are predefined. For instance, if the user responds to the first question by saying, "I don't know", this response would not be recognised even though it has a similar meaning to the predefined response "Not sure". To counter this, the user may be provided with the available options for response; however, this can be an inefficient mechanism which can greatly increase the time required for each stage of the conversation flow and can reduce user satisfaction with the dialogue system.

It can be seen from the above description that the effectiveness of a dialogue system depends strongly on how responses are matched to input queries. Setting a predefined conversation flow provides security with regard to the accuracy of the information provided to the user, but also results in a much less efficient system that may require a greater number of inputs to reach the required information.

By providing flexibility in the choice of answer, the required information may be reached more efficiently whilst also providing an improved user experience. The embodiments described herein achieve this, allowing users to respond in a variety of different ways whilst still maintaining the control provided by conversation flows.

Overall Method

Figure 3:
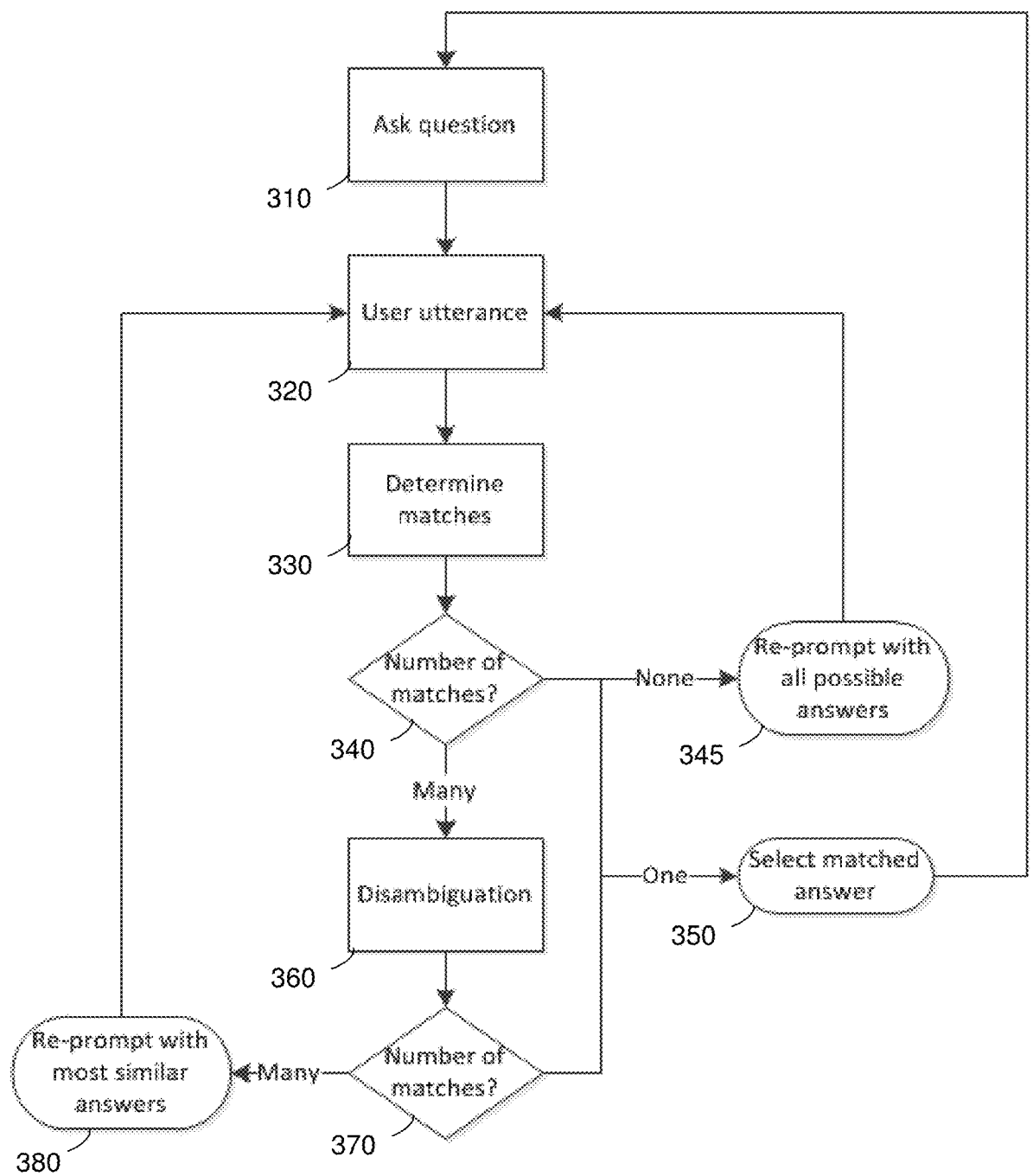
FIG. 3 shows a flowchart depicting an answer matching process according to an embodiment.

FIG. 3 shows a flowchart depicting an answer matching process according to an embodiment. This process includes a text similarity matching method, the use of a disambiguation algorithm, and a re-prompting strategy. Note that this assumes single selection; for the multiple answer matching as described later this process is run once for each inferred clause and the re-prompting strategy is adapted appropriately.

The method begins with a question being asked by the system 310. The question may be issued to the user via a display, via audio (e.g. speakers) or via any other form of appropriate user interface.

The user then responds to the question 320. In this case, a user utterance is received (e.g. via a microphone). The utterance is converted into its corresponding text (e.g., a set of one or more words recognised from the user utterance). The recognised text (a recognised set of one or more words) is then compared to a set of expected inputs with a view to determining one or more matches 330. A match is determined if the similarity of the recognised text to one of the expected inputs (e.g. based on semantic textual similarity) is greater than a predetermined threshold. The method of comparing the utterance to the predefined inputs is described in more detail later.

In the present case, as the input is a response to a question, the set of predefined inputs is a set of predefined responses to the question. It should be noted, however, that the input matching method described herein need not be performed in response to a question being asked, but may instead simply reflect an expected set of inputs by the user (for instance, a set of predefined requests from the user given a current state of the system).

The system then determines the number of matches 340. Naturally, it is always possible that the user says something totally different from any of the expected answers. In this case, none of the available answers will match the user utterance (none will have a similarity value with the utterance that exceeds a required similarity threshold).

If no matches have been found, the system re-prompts the user to repeat their input (answer the question again) 345. The re-prompting may be in the form of a request to rephrase their answer. Alternatively, the re-prompting may inform the user of the potential answers to the question (the list of expected inputs) 345. The system then loops back to step 320 to wait for the receipt of a follow-up utterance that should match at least one of the expected answers due to the re-prompting.

In one embodiment, for usability and efficiency, a limit is set to the maximum number of times this re-prompting may be performed in a row before marking the response as a failure. In this case, the system may either fail to complete the dialogue at all, or may map the response to a standard "I don't know" answer and move on to the next question.

If exactly one matched answer is found in step 340 then the matched answer is selected 350 and the system determines a corresponding response. If further questions remain then the response is a further question. In this case the method loops back to step 310 where the next question is asked. Alternatively, if the system has reached a conclusion (e.g. a diagnosis) then this can be output to the user as the response to the user's input.

If more than one expected answer matches the utterance, then the system implements a disambiguation method 360 in order to determine which of these utterances is correct (i.e. a new set of matches). This disambiguation method is described in more detail later.

After the disambiguation method, the system determines the number of matches that still remain after disambiguation 370. If no matches remain then the method moves to step 345 to re-prompt with all potential inputs/answers. If only one match remains then the method moves to step 350 to select the matched answer. If more than one match remains after disambiguation then the system re-prompts the user with the most similar answers (i.e. the remaining matches). This allows the user to select from the potential matches that the system has identified. The method then loops back to step 320 to detect the utterance and determine matches 330.

Accordingly, embodiments described herein provide the security of conversation flows whilst providing mechanisms for matching a variety of potential inputs to a user utterance to make the approach more flexible and efficient. The approach described herein makes use of conversation flows, with states corresponding to questions and different answers to those questions corresponding to transitions between states.

Note that, while a tree is an intuitive mental model for these flows, the embodiments described herein are not limited to a specific means of generating the questions and answers required in the conversation flows. That is, whilst a full dialogue flow may be provided, with predefined questions following on from each answer, the embodiments described herein are not limited in this regard.

In an alternative embodiment, whilst each question (or, more generally, each prompt for information) output by the system has a predefined number of answers (a predefined number of inputs in response to the prompt for information), and therefore can be considered a shallow dialogue flow in itself, each question may be generated on the fly by the system using the inference engine 11.

The inference engine 11 is a module that applies logical rules to the knowledge base to deduce new information (infer information from the input information, the knowledge base and the probabilistic graphical model). The inference engine 11 aims to answer a specific overall question (in this case, "what is the diagnosis?"). When a new question is required, the inference engine 11 selects, from a set of predefined questions, the question that is most likely to reduce the overall uncertainty within the system. Each question has a corresponding set of predefined answers.

In the present case, the inference engine 11 utilises a probabilistic graphical model to determine a diagnosis. The inference engine 11 selects a question and an expected set of answers by choosing the question that would most increase the value of information (i.e. that would most decrease uncertainty in the diagnosis). The user's answer is then passed back to the inference engine which uses this new information to generate a further question.

Nevertheless, regardless of how the questions are generated, the embodiments described herein provide flexibility in user response whilst avoiding the need to train a specific machine learning classifier for each potential answer.

The above method relates to the recognition of a user "utterance". This generally relates to speech recognition, where the sound of a user's speech is converted into corresponding text (e.g. the set of words or phonemes uttered by the user). Having said this, the method is equally applicable to any other form of input conferring a response to a question, for instance typed responses by a user to a question. There is a need for disambiguation between potential answers in unconstrained response regardless of whether the response is vocal or textual.

It should be noted that, whilst the embodiment of FIG. 3 relates to a series of questions issued by the system and answers input by the user, the method is equally applicable to inputs by the user and potential responses from the system, each response being associated with one of a set of predefined inputs for a given state of the system.

Answer Matching

The present approach to answer matching relies on a method of evaluating semantic textual similarity (STS) to determine which answer is selected based on the user utterance. An example to give a sense of how this is achieved is:

Q: Do you have a cough?
A: "Not really"

The question is taken from the conversation flow shown in FIG. 1. In this example, although "Not really" is not exactly any of the expected answers to the question as shown in FIG. 1, it is semantically similar to one of the provided answers ("No").

In general, the system of the present embodiment selects the answer with text that is most semantically similar to the utterance. In this way the system can effectively map the open response onto one of the constrained responses that the original conversational agent is able to handle. Note that the exact same procedure can be performed for determining the initial user intent for the dialogue (that can define the questions asked by the system), as those initial intents (initial inputs) are simply possible "answers" or branches corresponding to the initial state (e.g. "How can we help you?" or "What seems to be the issue?"). This is the case even if no question has been asked to the user, but the user instead initiates the conversation through the initial input.

A text similarity function may be implemented using general-purpose distributed vector representations for sentences. That is, each set of words to be compared (e.g. the user utterance and each of the potential answers) is converted into a corresponding vector or set of vectors within an embedded feature space. There are many techniques for learning such representations in an unsupervised manner, which have seen much success for producing high-quality representations for downstream similarity tasks.

For any of these methods, the semantic textual similarity (STS) can be computed by embedding the utterance and all the answer texts and calculating an appropriate vector-based similarity function, such as cosine similarity. A predefined threshold similarity level can be implemented such that any predefined answer that has a similarity to the user utterance that exceeds the threshold is determined to be a match.

The answer texts can be embedded in advance and the embeddings can be stored in for comparison with any input utterance. The utterance can then be embedded, once received, and compared to the available answers for the present state. Hence these representations can be used to robustly allow open-ended user utterances, even without a large amount of data specific to the particular conversation in question.

A variety of similarity metrics can be used when comparing two sets of words. Firstly, an average similarity can be taken from the similarity between each word in each of the two sets of words being compared. Alternatively, a similarity score for the overall similarity between the words (the sentence similarity) can be determined (e.g. using the Jaccard similarity coefficient).

As discussed above, each predefined answer that has a similarity to the user utterance that exceeds a predefined similarity threshold is determined to be a match to the user utterance. As described with reference to FIG. 3, various mechanisms are implemented based on whether no matches are found, only one match is found, or multiple matches are found.

The similarity acceptance threshold may be set relatively high to maintain high precision in the answer matching. To improve the recall, additional example utterances for each answer option can be stored, and the maximum similarity taken from the similarities relating to each example utterance for the answer can be determined for computing the overall similarity to the answer. While this involves some manual effort in compiling the example utterances, it is still much simpler and more efficient than annotating data and training a new model for answer matching for each specific topic or question.

Sometimes the text similarity function may be unable to distinguish between potential answers with sufficient confidence. For example, many distributed representations are not sensitive to exact word choices. This allows the recognition of similar phrases; however, it can also result in the system mapping a sentence and its negation to similar vectors since they often only differ by a single word (e.g. "not"). In this situation the system makes use of a disambiguation algorithm that is sensitive to different sentential properties than the embedder. For this case, a measurement like Jaccard set similarity, which treats words as discrete units, will be able to pick out differences in exact wording. Alternatively, a less efficient and finer grained similarity algorithm can be used that explicitly takes into account aspects such as logical negation that are not well accounted for by the initial similarity test. Generally, a similarity metric should be used for disambiguation that has higher precision and lower recall than the similarity metric used for the initial answer matching.

Finally, while for various reasons it makes sense to use non-task-specific textual similarity methods as described above, clearly the answer matching process is really a classification problem, where the task is to classify an utterance into one of the possible responses to the question. Given sufficient data it therefore makes sense to train a classifier in a supervised manner for common question types, such as binary yes-or-no questions. The present embodiment allows such task-specific improvements to be heterogeneously incorporated, while not relying on them exclusively.

Information Extraction

Given that the user responses are unconstrained in the present embodiment, it is conceivable (and depending on how the questions are phrased, even likely) that the utterance will contain extra information besides what is requested by the previous question. This might not only negatively impact the answer matching, but also will probably contain information relevant to the progression of the conversation.

Consider the Following Example:

Q: Have you injured your head?

A: "No, but I did hurt my neck the other day."

Here the user response answers the question ("No"), but also answers a follow-up question that the dialogue system might have asked ("Have you injured your neck?").

It therefore makes sense to use additional information extraction techniques on the full text. One way to do this effectively is to assume that the conversational flows are governed by an ontology or by entities in some way. This is generally the case in slot-filling type dialogue systems. For instance, the system of claim 1 makes use of a knowledge base that describes an ontology containing entities and their relationships. An entity may be an object, attribute, event, situation or concept. In the system of claim 1, the knowledge base may describe the relationships between various symptoms and medical conditions. Each question is selected by the inference engine 11 in an attempt to determine a medical condition that applies to the user's symptoms and attributes. The system can not only use the answers to the questions, but also additional information that is extracted from the user's inputs.

The system may make use of specific information extraction algorithms for the relevant entities for the conversational domain, although these can be quite general and may not necessarily be tuned for specific dialogues. The entities may relate to potential answers to future questions, or any other information that the system may need (e.g. semantic triples relating to information within the knowledge base).

In particular, suppose that there is a set of entities (slots) whose values must be known in order for the conversational assistant to fulfil the user's intent and each question in the dialogue is asking for the value of one of these entities. If something the user says contains the value of another of these entities, and the system is able to extract that value, then there is no need for the system to ask for this information at a later time within the dialogue because the system has already extracted the information.

For the above example, the user's response resolves not just the value of the entity requested (head_injury=false), but also the value of an additional entity (neck_injury=true), which answers a potential future question about neck injury.

To achieve this, the system uses information extraction techniques on the input in order to determine additional information that may not be covered by the selected input (the selected answer to the specific question that has been asked). This can be via the extraction of semantic triples from a semantic graph formed from the user's input. The extracted information is then sent to the inference engine, along with the selected input, in order to help inform the inference engine's response to the input.

Alternatively, if the questions are defined by a dialogue flow, the system may compare the input text to all of the potential future inputs further down the current branch of the dialogue flow (i.e. not just the potential inputs for the current state of the system). If the system identifies a match that relates to an input that is not one of the available inputs for the present state of the system (the current question), then it makes a note of this match, but does not include this match in the count of the number of matches for the present state (steps 340 and 370 in the method of FIG. 3). The system then skips the question corresponding to the additional identified match when this step is reached in the dialogue flow.

Using information extraction on the text of the user's response thus not only allows more naturalistic responses to be fully understood by the chatbot, but also potentially shortens the length of the conversation required to fulfil the user's intent.

Furthermore, matching the answer and continuing the dialogue without parsing the additional information contained in the utterance may give the user the false impression that the system has successfully incorporated all the information provided. Besides being a bad user experience, in safety-sensitive and highly regulated domains like healthcare, this is unacceptable and would not successfully pass validation.

The information extraction method described herein can be implemented using multiple answer matching in order to detect additional pieces of information within an input statement.

Multiple Answer Matching

Some multiple choice questions may allow more than one answer. Alternatively, a user may input multiple entities in a single statement. To detect this, multiple answer matching is utilised. This situation would be tricky to detect using only the methods described above, since a textual statement containing multiple answers will not necessarily be similar to the text of either answer on its own.

For Example:

Q: Where is the pain in your head?

A: "It hurts at the back and on the right side."

This utterance might not be semantically similar to answers like "At the back of my head" or "on one side", but it clearly contains both of those meanings implicitly. To obtain these meanings, the input utterance can be split into multiple inferred clauses.

To formalise the goal of detecting multiple answers expressed in a single input, known more generally as multiple intent recognition, we first define the inferred clauses of a sentence. These are the simplest complete semantic frames such that if you enumerate them and connect them with the appropriate conjunctions, you recover the meaning of the original sentence. For instance, the above example answer can be decomposed into the inferred clauses "it hurts at the back" and "it hurts on the right side".

Once an utterance is decomposed into its inferred clauses, the semantic similarity is calculated between each of those clauses and the answers to the question, in exactly the same way as described with regard to FIG. 3 for the entire utterance. This is generally equivalent to repeating the method of FIG. 3 for each inferred clause; although the rules regarding when to re-prompt the user are different for situations where multiple answers to a question may be selected.

Specifically, steps 330 and 340 are repeated for each inferred clause. The aim is for each inferred clause to match only one predefined input 350. If multiple inferred clauses match a single predefined input 350 then the system selects this predefined input 350, as this may amount to the user repeating themself using different words.

The key difference with the multiple answer matching method relative to FIG. 3 is that step 345 to re-prompt with all possible answers is only performed if none of the inferred clauses have any matches (i.e. if all of the inferred clauses have no matches).

Note also that the extraction of multiple inferred clauses dovetails nicely with the extra information extraction described above. By adapting the re-prompting for inferred clauses, the current embodiment avoids re-prompting for inferred clauses relating to additional information that do not relate to expected answers to the current question.

Segmenting the user utterance into simpler self-contained structures like inferred clauses can help with the extraction relevant information from each, as well as "mix and match" information extraction and answer matching for each of the clauses.

Figure 4A:
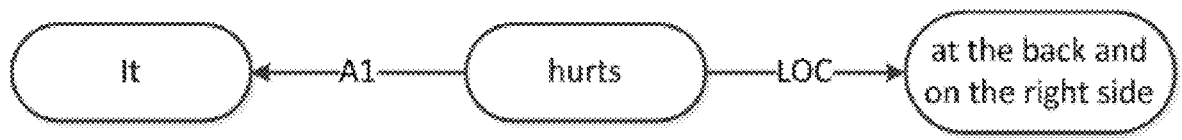
FIG. 4A shows an example of a shallow semantic graph formed based on semantic role labelling (SRL) for the sentence "it hurts at the back and on the right side.

For determining the inferred clauses of a piece of text, the problem of semantic parsing is considered, which is the conversion of natural language to a logical form encoding its meaning. This logical form can be naturally expressed as a graph, which for the present application should have the following components:

Semantic role labelling (SRL), which determines the semantic dependencies between the verbs in a sentence and their arguments ("who did what to whom"). This is a relatively shallow semantic parse of the sentence. The SRL graph for the example sentence "It hurts at the back and on the right side" is presented in FIG. 4A.

Conjunction splitting on the arguments, which provides more granularity around the nouns and modifiers in the sentence. For the present example, this would split the location modifier into the two nodes "at the back" and "on the right side".

Chaining of verbs in subordinate clauses, which allows the connection of separate SRL trees in multi-verb sentences. For instance, in "I think it hurts at the back", shallow SRL generates two disconnected trees, one for each verb in the sentence; in contrast, the semantic graph formed by the present embodiment needs to capture the semantics of the entire utterance and therefore requires a connection between these verb trees.

Accordingly, the methods described herein form a semantic graph based on the semantic relationships between the words within the user's input. The semantic relationships that are determined from the input text are similar to those determined in semantic role labelling (SRL); however, the formalism used is more flexible and generates more complex graphs. Whilst SRL is limited to determining relationships between a verb and other words, the present formalism can determine relationships between non-verbs (e.g. between nouns), can link multiple verbs together (e.g. verb chains) and can split conjunctions to provide finer granularity. The output is a semantic dependency graph such as that shown in FIG. 4B.

Figure 4B:
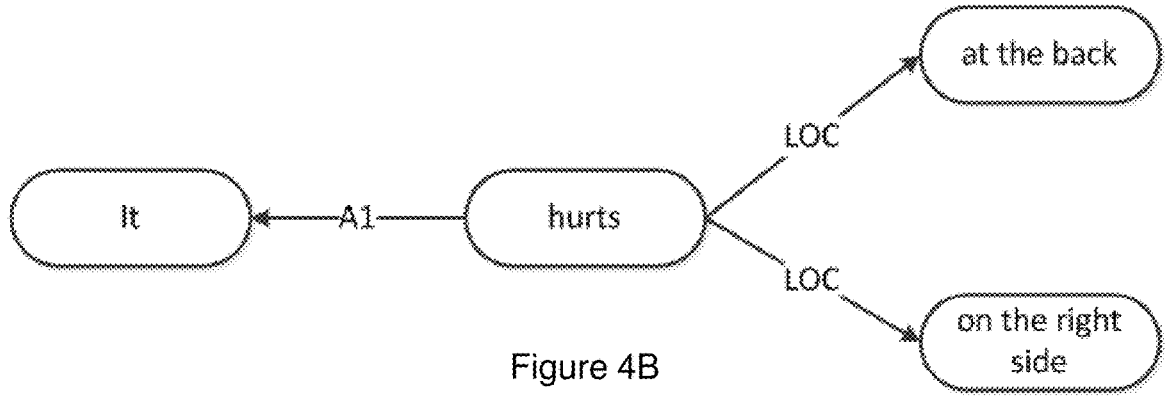
FIG. 4B shows an improved semantic graph for the sentence of FIG. 4A making use of conjunction splitting.

FIG. 4B shows an improved semantic graph for the sentence "it hurts at the back and on the right side. The graph consists of a number of nodes connected by edges. The nodes represent different semantic groupings of one or more words taken from the original input text. The edges represent the semantic relationship between each group. Each pair of groups that is related is connected via an edge.

In the present embodiment, the graph is built around a root verb. This is the verb (e.g. the action state or occurrence) that forms the core of the input statement. In this case, the root verb is "hurts". This therefore forms the central node. The root verb is connected to a number of semantic groups. In the present case, three semantic groups are connected to the root verb. A first group contains the word "it". This is assigned the semantic role A1 corresponding to the proto-patient. The other two groups of words are "at the back" and "on the right side". These are assigned the role location corresponding to the location of the pain. As these last two groups relate to separate locations, they are separate groups. Unlike the graph of FIG. 4A, the conjunction in the input text is split to produce two separate location nodes. Whilst this graph is built around one root verb, if multiple verbs are contained within the user input, then these can be chained together to form a more complex graph containing multiple verbs.

Different clauses can be extracted from the input text based on the semantic graph. An inferred clause is defined as any clause that can be constructed from a given sentence by starting with a root of the sentence (e.g. a root verb) and adding at most one element from each of its semantic roles, including adverbs and other modifiers. Generally speaking, the inferred clauses are the simplest syntactically complete sentences such that if you enumerate them and connect them with the appropriate conjunctions, you recover the meaning of the original sentence.

Note that this is closely related to what is known in linguistics as coordination reduction, since coordinated clauses are a common way of expressing multiple intents in a single sentence. However, it is not the only way inferred clauses are manifested (consider "The back of my head hurts, and so does the right side").

Figure 4C:
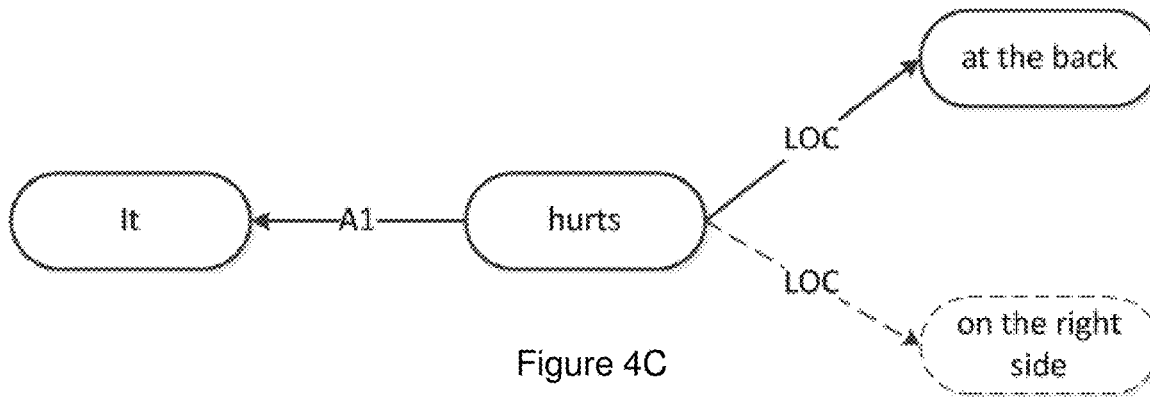
FIG. 4C shows a first inferred clause extracted from the graph of FIG. 4B.

FIG. 4C shows a first inferred clause extracted from the graph of FIG. 4B. The extracted section of the graph not falling within the first inferred clause is depicted with a dashed line. In this case, the clause "it hurts at the back" is extracted by combining the agent ("it") and the position ("at the back") with the root verb ("hurts").

Figure 4D:
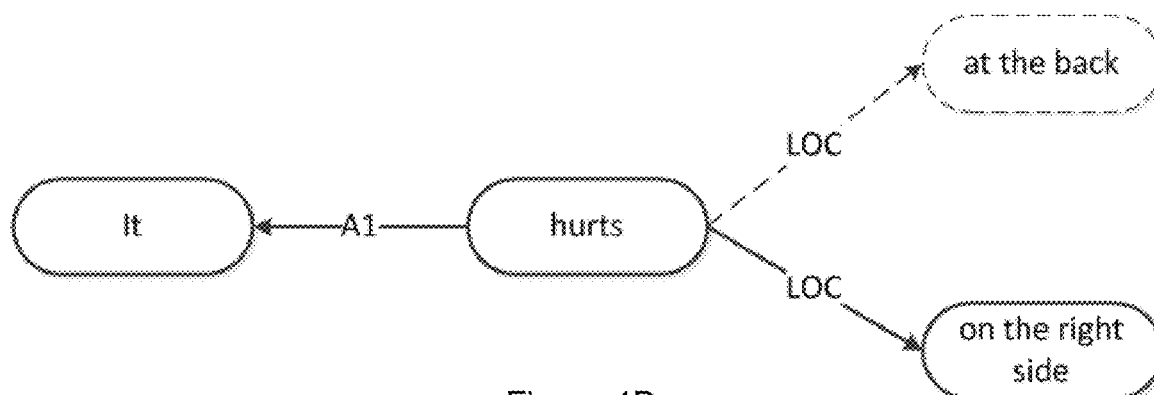
FIG. 4D shows a second inferred clause extracted from the graph of FIG. 4B.

FIG. 4D shows a second inferred clause extracted from the graph of FIG. 4B. The extracted section of the graph not falling within the second inferred clause is depicted with a dashed line. In this case, the clause "it hurts on the right side" is extracted by combining the agent ("it") and the position ("on the right side") with the root verb ("hurts").

Once an utterance is decomposed into its inferred clauses, the system can compute the semantic similarity between each of those clauses and the potential answers to the question in the same way as discussed above.

Any extra information extracted through this method can be used as discussed above in the section "Information Extraction". Segmenting the user utterance into simpler self-contained structures like inferred clauses can help with the extraction of relevant information from each, as well as "mix and match" information extraction and answer matching for each of the clauses.

The present embodiment employs a traversal algorithm over the semantic graph to find paths corresponding to inferred clauses. The algorithm starts at the root node(s) (e.g. the root verb(s)) and recursively builds up candidate clauses by adding words corresponding to semantic roles and bifurcating the candidate set if the semantic role has been encountered before.

In light of the above, the methods described herein produce inferred clauses from an input by forming every potential combination of nodes in which exactly one node for each semantic role for each parent node has been selected (and wherein the combination still forms a contiguous chain of semantically linked nodes), and then concatenating the words associated with the selected nodes. This can be achieved by determining every possible combination of the root node and its descendants wherein each combination is selected such that the nodes within the combination form a contiguous series of connected nodes within the semantic graph and wherein every possible descendent of the root node from the semantic graph is selected with the exception that, for each parent node that is a descendent of the root node, only one child node is selected for each type of semantic relationship that the parent node has with its one or more child nodes.

Once the inferred clauses are determined, they can be matched to predefined inputs as described herein.

One downside of this approach is that it depends on the output of a semantic parser, which is itself a challenging problem. On the other hand, the answer matching methods described herein have been empirically shown to perform well even for inaccurately separated inferred clauses.

Prior work on multiple intent recognition primarily consists of coordination reduction, essentially segmenting the sentence along coordinators like "and", "or", or "but". The present approach is a generalisation of this to other semantically-informed cases.

Another line of research treats the problem as a multi-label classification problem, in which each sentence is labelled with its potentially multiple intents, or a sequence-labelling problem in which each word is assigned to an intent. This latter approach is intuitively achieving a similar effect to the systems described herein; however, the downside of these classification approaches is that they are supervised learning techniques requiring annotated conversational training data. It can be difficult to obtain sufficiently large sets of labelled data to enable such supervised learning systems to be trained for their specific task. In addition, such systems generally need to be trained for their specific type of dialogue. In contrast, the methods described herein rely solely on unsupervised representation learning and well-established, "off-the-shelf" models that encode linguistic prior knowledge. Supervised learning methods also do not naturally extend to arbitrary numbers of intents, while the present embodiments do, as they do not require specifically trained models.

Adaptations for Voice

The embodiments described herein may be adapted specifically for use with voice input. Additional modifications can allow the system to improve accuracy for voice input.

One important consideration is ensuring that the dialogue system is robust to errors arising from the automatic speech recognition (ASR). While ASR algorithms are increasingly accurate, there are still errors, particularly during more casual conversations when there is often a greater number of linguistic irregularities and shorter utterances.

Embodiments make use of distance based methods on phonetic representations of text as an additional measure of textual similarity. This is similar to the edit distance-based methods for spell checking. To be precise, one embodiment of the system makes use of the transcription of the text into the International Phonetic Alphabet (IPA), and computes the Dolgopolsky distance between these phonetic representations as a fallback in the case of no matches from the answer matching algorithm detailed above.

Accordingly, when no matches have been detected using the similarity metric discussed above, the present embodiment determines whether there exist any similar sounding inputs (e.g. homophones of the input text) might match any of the predefined inputs. To do this, the system transcribes the input text into a phonetic representation (such one in accordance with the International Phonetic Alphabet, although alternative phonetic alphabets may be utilised). This represents the input text in terms of the way that it would sound when spoken. The phonetic distance between the input text (in its phonetic representation) and phonetic representations of each of the predefined potential inputs is then determined. If the phonetic distance between the input and one of the expected inputs is less than a predefined threshold, then the system determines this to be a match.

In one specific embodiment, the metric for phonetic distance that is used is the Dolgopolsky distance. This is calculated by computing the Levenshtein distance based on Dolgopolsky equivalence classes. Dolgopolsky equivalence classes are categories of phonemes. In other words, the input text is converted into a set of Dolgopolsky equivalence classes and the Levenshtein distance is utilised to determine the phonetic distance relative to the Dolgopolsky equivalence classes of each of the predefined inputs (how many classes need to be changed in order for the two sets of classes to match).

The system therefore includes an additional step for detecting one or more matches based on the phonetic distance between the input and the expected inputs. The method responds to the number of matches in a similar manner to step 370. That is, if one match is found, then this is selected as the input 350, if no matches are found, then the system re-prompts with all potential inputs, if more than one match is found, then the system re-prompts with the set of matched inputs.

As a simple example, suppose the dialogue agent needs to determine the user's gender. If the utterance is "male", it is found empirically that without any further context, the ASR's language model is liable to transcribe this as "mail" as it is a more common word, which is semantically quite different from the term "male". However, as the terms "male" and "mail" are homophones, the Dolgopolsky distance between them is zero. The phonetic fallback is therefore able to match this utterance correctly.

Summary and Computer Implementation

The above described embodiments achieve more natural and flexible text or voice-based conversational agents, while only needing to manually build and validate a constrained-option agent. Another advantage of the present approach is that it does not rely on large quantities of training data for specific dialogues. This is achieved using distributed sentence representations to match user utterances against answers to questions, semantic role labelling to segment sentences and match multiple intents, and information extraction to extract answers to potential questions from the user utterance. For voice applications in particular, a simple method is presented to make sentence similarity measurements robust to automatic speech recognition (ASR) errors by taking into account the phonetic similarity of utterances to each other.

Figure 5:
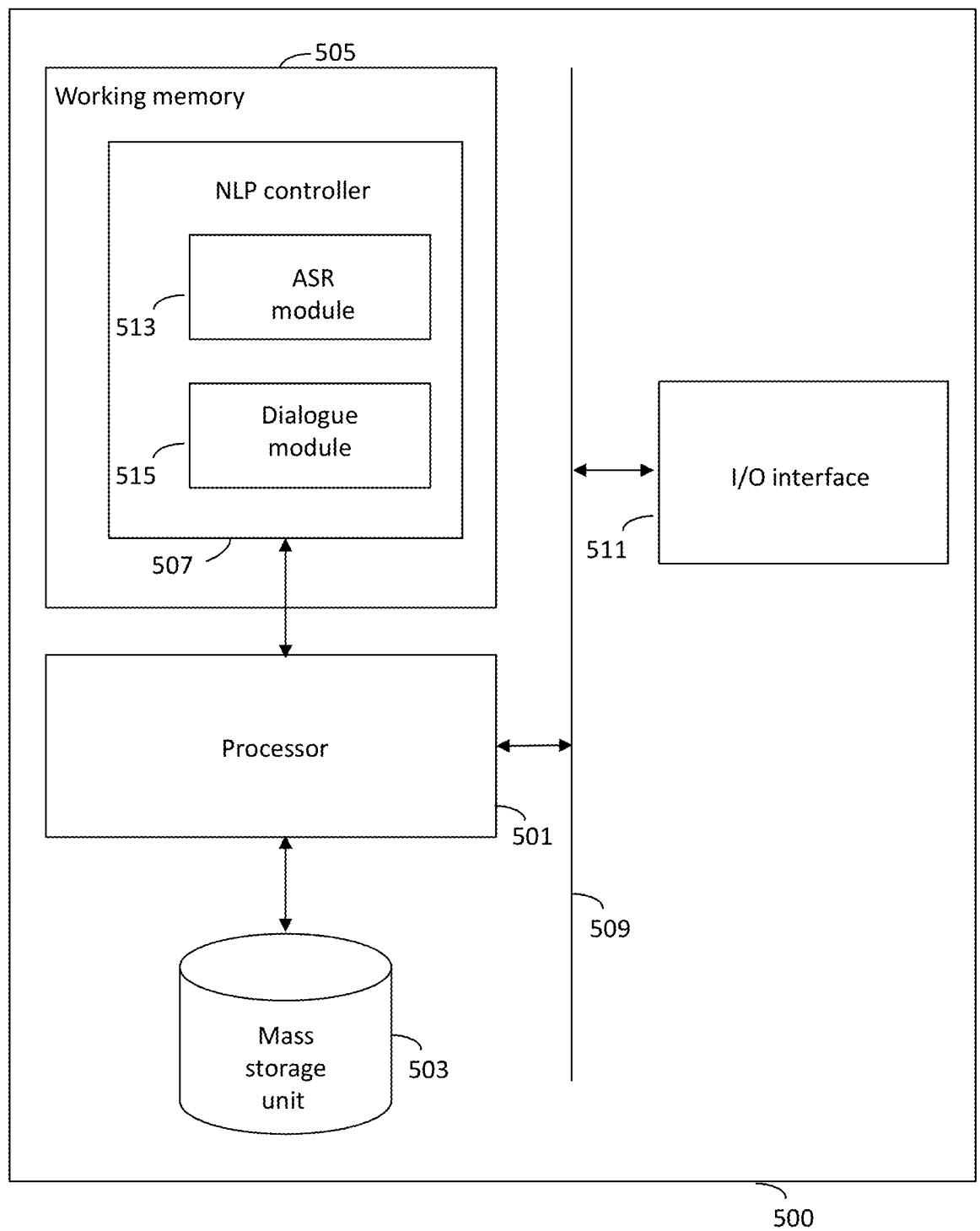
FIG. 5 shows a computing system for implementing the methods described herein according to an embodiment.

While the reader will appreciate that the above embodiments are applicable to any commuting system for recognising user inputs, a typical computing system is illustrated in FIG. 5, which provides means capable of putting an embodiment, as described herein, into effect. As illustrated, the computing system 500 comprises a processor 501 coupled to a mass storage unit 503 and accessing a working memory 505. As illustrated, a natural language processing (NLP) controller 507 is represented as a software product stored in working memory 505. However, it will be appreciated that elements of the NLP controller 507 may, for convenience, be stored in the mass storage unit 503.

Usual procedures for the loading of software into memory and the storage of data in the mass storage unit 503 apply. The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

The NLP controller 507 includes an automatic speech recognition (ASR) module 513 and a dialogue module 515. The ASR module 513 is operable to receive an utterance from a user (e.g. via input from a user device, such as a mobile phone), to recognise one or more words in the utterance and to notify the dialogue module 515 of the one or more words. The ASR module 513 might output the words as text or as word vectors coded according to a coding scheme.

The dialogue module 515 is configured to determine whether the input one or more words match any of the predefined inputs stored in the mass storage unit 503 and to output a response to the user input as described herein in order to simulate a conversation according to the predefined conversation flow. The user input may be embedded as a set of one or more word embeddings for processing by the ASR module 513 or by the dialogue module 515. Thus, execution of the NLP software 507 by the processor 501 will cause embodiments as described herein to be implemented.

The NLP controller software 507 can be embedded in original equipment, or can be provided, as a whole or in part, after manufacture. For instance, the NLP controller software 507 can be introduced, as a whole, as a computer program product, which may be in the form of a download, or to be introduced via a computer program storage medium, such as an optical disk. Alternatively, modifications to an existing NLP controller 507 can be made by an update, or plug-in, to provide features of the above described embodiment.

As discussed above, the ASR module 513 is optional, and instead the dialogue module 515 may function equally well at implementing the dialogue flow if the user input is in the form of text.

The computing system 500 may be an end-user system that receives inputs from a user (e.g. via a keyboard or microphone) and determines responses to the inputs based on the similarity of the inputs to predefined inputs. Alternatively, the system may be a server that receives input over a network and determines the response which is then conveyed back to the user device. Either way, the system is configured to determine a response user inputs to implement a conversation flow, as discussed herein.

The mass storage unit 503 stores predefined inputs and corresponding responses to those inputs. As described herein, the dialogue module 515 is configured to determine similarity values with respect to an input phrase relative to each of the predefined phrases for the current state of the system (the current position within a predefined dialogue flow). The system is then able to determine the most similar predefined phrase and then respond with the corresponding predefined response that is associated with that predefined phrase. The predefined phrases may be stored as sets of embedding vectors.

The methods described herein provide a means of resolving ambiguity where users are free to input any response while still maintaining the security of predefined dialogue flows. The embodiments described herein therefore provide improvements in natural language processing that can improve the accuracy and efficiency of artificial conversational entities.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented natural language processing method comprising:
   receiving a user input comprising a set of one or more words;
   retrieving a predefined set of potential inputs, each potential input comprising one or more words;
   determining, for each of the potential inputs, a first similarity score indicating similarity between the respective potential input and the user input;
   determining whether any of the potential inputs has a first similarity score that exceeds a predefined threshold;
   in response to exactly one of the potential inputs having a first similarity score that exceeds the predefined threshold, selecting the one of the potential inputs and outputting a response based on the one of the potential inputs;
   in response to a plurality of potential inputs having a first similarity score that exceeds the predefined threshold, determining, for each of the plurality of potential inputs, a second similarity score indicating similarity between the respective potential input and the user input; and
   in response to none of the potential inputs having a first similarity score that exceeds the predefined threshold, determining a phonetic distance between phonetic representations of the respective potential input and the user input.

2. The method of claim 1 wherein:
   the first similarity scores are determined based on a first measure of similarity, wherein the second similarity score is based on a second measure of similarity that differs from the first measure of similarity.

3. The method of claim 1 further comprising:
   determining whether any of the plurality of potential inputs has a second similarity score that exceeds a second predefined threshold; and in response to exactly one of the plurality of potential inputs having a second similarity score that exceeds the second predefined threshold, selecting the one of the potential inputs and outputting a response based on the one of the plurality of potential inputs.

4. The method of claim 1 wherein the second measure of similarity is one or more of:
   higher precision than the first measure of similarity;
   more sensitive to exact word choices than the first measure of similarity; or
   more sensitive to negation within the user input or the potential inputs than the first measure of similarity.

5. The method of claim 1 wherein the user input is derived from speech recognition of a user utterance.

6. The method of claim 1 wherein the phonetic representations comprise Dolgopolsky equivalence classes.

7. The method of claim 1 further comprising:
   in response to none of the plurality of potential inputs having a second similarity value that exceeds the predetermined threshold, issuing a request to the user to repeat their input.

8. The method of claim 7 wherein the request to the user to repeat their input comprises a notification to the user of each of the plurality of potential inputs.

9. The method of claim 1 further comprising:
   in response to none of the potential inputs having a similarity value that exceeds the predetermined threshold, issuing a request to the user to repeat their input.

10. The method of claim 9 wherein the request to the user to repeat their input comprises a notification to the user of each of the potential inputs.

11. The method of claim 1 wherein:
    one or more of the potential inputs comprises a plurality of possible phrases corresponding to the user input; and
    the corresponding similarity score for each of the one or more potential inputs is determined by:
      determining a similarity score for each possible phrase indicating the similarity between the respective possible phrase and the user input; and
      determining a maximum of the similarity scores for the possible phrases.

12. A system for natural language processing, the system comprising a processor configured to:
    receive a user input comprising a set of one or more words;
    retrieve a predefined set of potential inputs, each potential input comprising one or more words;
    determine, for each of the potential inputs, a first similarity score indicating similarity between the respective potential input and the user input;
    determine whether any of the potential inputs has a first similarity score that exceeds a predefined threshold;
    in response to exactly one of the potential inputs having a first similarity score that exceeds the predefined threshold, select the one of the potential inputs and outputting a response based on the one of the potential inputs;
    in response to a plurality of potential inputs having a first similarity score that exceeds the predefined threshold, determining, for each of the plurality of potential inputs, a second similarity score indicating similarity between the respective potential input and the user input; and
    in response to none of the potential inputs having a first similarity score that exceeds the predefined threshold, determining a phonetic distance between phonetic representations of the respective potential input and the user input.

13. A non-transitory computer readable medium comprising instructions that, when executed by a processor, cause the processor to perform a method, the method comprising:
    receiving a user input comprising a set of one or more words;
    retrieving a predefined set of potential inputs, each potential input comprising one or more words;
    determining, for each of the potential inputs, a first similarity score indicating similarity between the respective potential input and the user input;
    determining whether any of the potential inputs has a first similarity score that exceeds a predefined threshold;
    in response to exactly one of the potential inputs having a first similarity score that exceeds the predefined threshold, selecting the one of the potential inputs and outputting a response based on the one of the potential inputs;
    in response to a plurality of potential inputs having a first similarity score that exceeds the predefined threshold, determining, for each of the plurality of potential inputs, a second similarity score indicating similarity between the respective potential input and the user input; and
    in response to none of the potential inputs having a first similarity score that exceeds the predefined threshold, determining a phonetic distance between phonetic representations of the respective potential input and the user input.

* * * * *